…

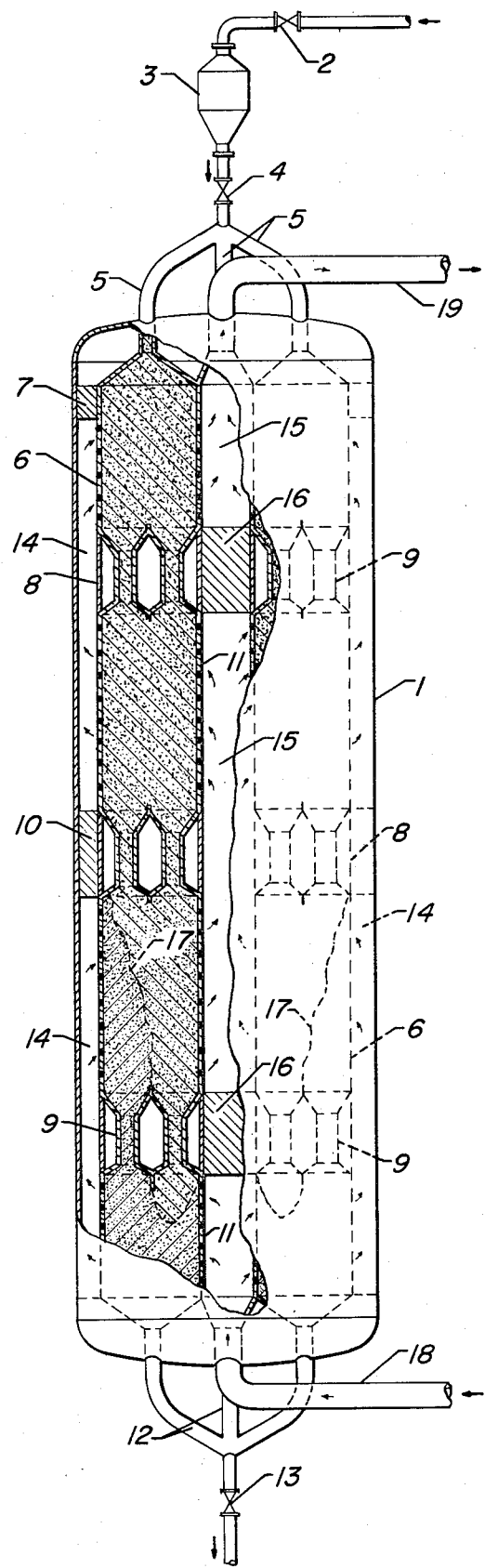

United States Patent Office 3,799,866
Patented Mar. 19, 1974

3,799,866
HYDROCARBON CONVERSION PROCESS UTILIZING A MOVING BED REACTOR
Robert A. Lengemann, London, England, assignor to Universal Oil Products Company, Des Plaines, Ill.
Filed Oct. 18, 1972, Ser. No. 298,711
Int. Cl. C10g 35/06
U.S. Cl. 208—139                11 Claims

ABSTRACT OF THE DISCLOSURE

A moving bed of a catalyst which deactivates in a zonal manner is transferred downward through a multipass radial flow reactor while a hydrocarbon feed stream flows in a stepwise countercurrent fashion across the catalyst. To provide uniform conversion and maximum usage of the catalyst, a zone of active catalyst and a zone of deactivated catalyst are both maintained across the height of a single selected pass by controlling the catalyst transfer rate.

BACKGROUND OF THE INVENTION

Field of the invention

The invention relates to hydrocarbon conversion using countercurrent flow of the reactants and a solid catalyst through a radial flow, moving bed reactor. It is specific to those instances in which the catalyst is deactivated by a component of the feed stream, such as the hydrolysis of a halogen promoter by water in commercial n-paraffin isomerization, or some other phenomenon which causes a sharp, zonal deactivation front to migrate through a catalyst bed.

Description of the prior art

The problem of zonal or "flame-front" deactivation of commercial isomerization catalysts by water or other impurities is discussed in U.S. Pats. 3,506,733 and 3,540,998 which present improved methods of removing the impurities by adsorption and the use of spent catalyst as an absorption medium. Use of spent catalyst to remove sulfur by absorption is presented in U.S. Pat. 2,401,334. It is well established in the art to use two reactors in series on a "swing" basis to allow continuous operation of the process by alternating the regeneration or replacement of the spent catalyst between the reactors.

Using multipass moving bed reactors to achieve continuous operation and uniform products is also well known as shown by U.S. Pats. 3,470,090 and 3,647,680 on the subject of reforming. The use of countercurrent or radial flows in moving bed reactors extends back to U.S. Pat. 2,303,717, but it has not been found that countercurrent flow has been used to control the location of a deactivation front. Further, it is believed novel to localize the deactivation front in a single pass of a multipass radial flow reactor and to use a prior pass to ensure complete usage of the catalyst before ejection from the reactor. A moving bed reactor advantageously using cocurrent flow to perform transalkylation and isomerization of methyl benzenes has been presented in U.S. Pat. 3,211,798. Disclosed is the use of changes in catalytic properties caused by carbon deposition to preferentially perform the different operations in separate zones.

SUMMARY OF THE INVENTION

The stepwise countercurrent flow of reactants and catalyst and a controlled catalyst transfer rate are used to localize a deactivation front and to thereby achieve continuous operation of a process which produces zonal deactivation of the catalyst. Conservation of active catalyst and convenient control of the catalyst transfer rate may be obtained by localizing the deactivation front in a second pass and maintaining some active catalyst in a first pass of the reactants over the catalyst.

DESCRIPTION OF THE DRAWING

One possible configuration of a reaction zone using the present invention is illustrated in the attached drawing of a multipass radial flow reactor providing for four passes of the reactants over separate quantities of catalyst. A basic feature is the downward flow by the force of gravity of a dense bed of catalyst which enters the system through valve 2 and accumulates in lock hopper 3. As needed a purge, drying or reduction step could be conducted at this point using gases entering the lock hopper by a means not shown. Alternatively, the lock hopper may be a storage drum of catalyst already preconditioned in a manufacturing or regeneration process. Discrete quantities of the fresh catalyst are intermittently passed through valve 4 into the numerous catalyst distribution ducts 5 spread around the top of the reactor. These ducts, or catalyst inlet means, may vary in size or shape and may even be totally within the outer vessel 1 of the reactor. The new catalyst is supported by the older catalyst below it and confined to an annular shaped bed between the outer catalyst retention screen 6 and the inner catalyst retention screen 11. Quantities of deactivated catalyst are intermittently removed from the bottom of the reactor through valve 13 for regeneration or metals recovery. This causes the catalyst above to settle through collecting ducts 12, shown as the catalyst outlet means, and the whole of the catalyst bed between the catalyst retention screens to move downward.

The uppermost pass is shown as a small guard or clean-up zone which is used to ensure complete processing of any reactants which may slip through the other passes unconverted. The size of each pass is considered the height of the catalyst retention screen forming its sides. The reactants in this case pass inward from the outer annular or reactant distribution volume 14, through the catalyst, and then into the cylindrical centerpipe volume 15. When the catalyst reaches the bottom of the pass, signified by an optional solid sheet 8 replacing the porous catalyst retention screen, the catalyst is channeled through several small diameter ports 9 which lead to the next pass below. The function of these ports is to prevent the reactants from flowing upward through the catalyst between the passes by increasing the pressure drop along this route. Similarly, the outer volume is sealed at the top by horizontal plates 7 and at its approximate midpoint by an outer flow diverting means 10, and the centerpipe is sealed by two inner flow diverting means 16 to channel the reactants back and forth over the various passes.

The two middle passes are shown as each containing about one-third of the total catalyst in the reactor, and together perform a very large percentage of the total conversion achieved in the reactor. Catalyst in the upper of the two passes gradually moves downward and is at a high level of activity as it passes into a second set of small diameter ports leading to the lower pass.

The reactants flow back and forth over the catalyst in a step like countercurrent fashion relative to the catalyst flow. Unconverted reactants enter at the bottom of the reactor at inlet tube 18 and pass into the centerpipe. They then flow outward over the lowest catalyst bed, up through the outer distribution volume 14, and then inward, etc., until emerging from the top pass as a product stream which leaves the reactor by outlet means 19.

In the embodiment shown, the catalyst in the second pass from the bottom is contacted by a reactant stream which still contains most of the deactivating impurity contained in the feed stream. This results in deactivation of the active catalyst closest to the outer retaining screen. Hence, at the top of this pass there is a thin band of deactivated catalyst around the reactor. When this deactivated catalyst descends it is replaced by fresh catalyst. Now, however, the closest actife catalyst to the outer screen at each lower point in the pass is inside the catalyst bed and the point of deactivation is closer to the inner screen. A wedge shaped ring of deactivated catalyst therefore forms around the bottom of the pass between the deactivation front 17 and the outer catalyst retention screen.

The thickness of this zone of deactivated catalyst can be controlled by varying the rate of catalyst transfer through the reactor. It is wasteful to not completely utilize the catalyst before ejecting it from the reactor, and it is undesirable to allow the zone of deactivated catalyst to expand completely across this pass because the pass is counted on to perform significant conversion and to prevent the deactivating impurity from reaching the other passes. For these reasons, a lower pass can be used as shown to ensure maximum catalyst usage by contacting some active catalyst in it with a relatively large amount of fresh charge stock. Before it can leave the reactor, the small amount of active catalyst is more or less smothered by the large amount of impurities flowing over it. The method presented to control the rate of catalyst transfer is to monitor the effluent of this prior pass and to adjust the transfer rate to maintain a small but definite amount of conversion in it. To represent this method of operation, a small zone of active catalyst is shown extending downward into the bottom pass from the port leading from the pass above. The presence of some active catalyst at this point guarantees a complete zone of active catalyst in the upper pass.

DETAILED DESCRIPTION OF THE INVENTION

A much used type of commercial catalyst consists of a platinum group metal and a halogen supported by an inorganic oxide such as alumina. A very significant part of this usage is in processes for the isomerization of hydrocarbons, such as the production of isoparaffins. Despite extensive feed pretreatment, the processes using some of these catalysts still experience extensive problems with deactivation of the catalyst by small amounts of impurities. This may be exemplified by the hydrolysis by water in the charge stock of the chlorine in the catalyst to form HCl. The active site previously promoted by the chlorine no longer exists. This deactivation mechanism starts at the reactor inlet, where the water first contacts the available halogen, and moves in a piston-like manner creating a zone of deactivated catalyst. Destruction of the active site also destroys the water and no further deleterious effects occur as the reactants continue through the remaining active catalyst.

Water is not the only cause of zonal deactivation, and other compounds such as sulfur or metals may produce similar effects. Sulfur is a poison to nickel containing catalysts such as those used in the gasification of naphtha, but the exact mechanism of the deactivation of these gasification catalysts has not been determined. It is believed related to sintering and crystal growth at high temperatures which reduce the available catalytic surface. Whatever the cause, it is well known that a zone of inactive catalyst starts near the reactor inlet and migrates in the direction of reactant flow, and that the location of this zone of deactivated catalyst may be determined from a temperature profile of the reactor. It is not yet possible to regenerate these gasification catalysts, and if active catalyst was discharged it would not be recycled because it cannot be separated from the deactivated catalyst. Normally, a commercial process will have two or more reactors, often operated in series, and the reactant flow is alternated between them to provide continuous operation. The effluent of the nearly deactivated reactor is passed through a second reactor until it is decided to take the first one off stream for replacement or regeneration of the catalyst.

The types of deactivation with which this invention is concerned do not include the customary build up of carbon deposits on the surface of the catalyst as in reforming or the poisoning of the catalyst by metals deposition as in crude oil desulfurization. These are normally gradual effects which occur in a zone-like manner only at points of high temperatures, high reaction rates, or poor circulation of the reactants and hydrogen. Deactivation as used in this discussion and the appended claims is intended to mean a reduction in a catalyst's activity to less than one-fourth of its normal ability to promote the specific reaction desired at the same conditions of temperature, pressure and prior usage. The chemical composition of a catalyst used for reforming and of one used for isomerization may be very similar, for example chlorine, platinum and alumina, but the deactivation mechanisms may be entirely different due to different methods of manufacture.

It is an object of this invention to provide a method for performing the affected hydrocarbon conversion processes continuously. It is a further object to eliminate the costly dual reactors and large diameter valve systems necessary with swing reactors. Still further, it is an object to prevent the discharge of active catalyst from the reactor and to beneficially use spent catalyst as an adsorption medium in the same reactor. The use of spent catalyst for feed pretreatment in isomerization is shown in U.S. Pat. 3,506,733. After deactivation of the catalyst by halogen removal, the base which remains is a chemically dried porous material, such as alumina, which is similar to standard feed stream drier packing.

These objectives are reached by the passage of the reactants over several separate quantities of catalyst in a stepwise countercurrent manner through a moving bed reactor. By moving bed reactor is meant a reactor in which catalyst added at the top descends to the bottom for removal in a dense, compact, nonfluidized mass similar to the plug flow of reactants. The intermittent catalyst transfer may occur at any suitable rate such as once an hour or once every several days. The fresh catalyst charged to the process may be unused or regenerated catalyst or catalyst which is to be prepared in the reactor prior to usage. A radial flow reactor having at least three passes is a preferred embodiment because the catalyst is segregated into separate quantities and the condition of the catalyst in each quantity can be easily determined by monitoring the reactant conversion. Radial flow reactors utilize horizontal flow of the reactants across the catalyst as opposed to axial flow reactors, which could be described as those having the reactants flow end to end through a tube of catalyst. The most practical method of moving a dense bed of solid catalyst through a reactor is to allow it to fall by the action of gravity. This restricts the reactant flow to being generally upward from one pass to another unless the reaction zone has means to transfer the catalyst upward between the passes.

A radial flow reactor is also preferred because upward flow of the reactants in an axial flow reactor tends to rise or fluidize the body of catalyst. This would hinder the downward flow of the catalyst and complicate the transfer of catalyst into and out of the moving bed reactor. In a radial flow reactor, the hydrocarbon does not flow countercurrent to the catalyst, but actually flows cross current. However, by the use of two or more passes the hydrocarbon flow may be channeled over the catalyst in a stepwise countercurrent fashion which more truly approximates full countercurrent flow as the number of steps is increased.

A feature of the present invention is the usage of a first, low conversion pass before the main pass having the deactivation front. This allows one to more easily maintain a zone of deactivated catalyst and a zone of active catalyst across the entire vertical surface of a second pass and to perform substantial conversion within this pass without discharging active catalyst. It also permits the control of the catalyst transfer rate by monitoring the reactant conversion upstream of the deactivation front. For there to be any conversion in this first pass, there must be a zone of active catalyst in the second pass which can be transferred downward. Therefore, the amount of conversion performed in the first pass is proportional to the thickness of the zone of active catalyst in the second pass. The rate of catalyst transfer is adjusted to maintain only a limited amount of conversion in the first pass and to actually smother the active catalyst with the impurity before it is discharged. This is represented on the drawing by a zone of active catalyst which extends about one-third of the way down the first pass. In the pass above this there are zones of both active and deactivated catalyst across the entire vertical surface area of the pass, and the reactants must contact active catalyst. The complete deactivation of the catalyst before it is discharged from the reactor is guaranteed by this method of operation.

As already noted, catalysts which suffer from zonal deactivation include those often used commercially for the isomerization of normal $C_4$–$C_6$ paraffins as performed in U.S. Pat. 3,131,235. Specific examples include the catalysts described in U.S. Pats. 2,999,074 and 3,112,351. A catalyst is formed according to the first reference by reacting a Friedel-Craft metal halide, such as aluminum chloride, with a refractory inorganic oxide, such as alumina, that has been previously composited with a platinum-group metal and calcined to cause the formation of chemically combined hydroxyl groups on the catalyst's surface. By platinum group metal is meant a metal selected from platinum, palladium, ruthenium, rhodium, osmium, and iridium.

The reactions to which this process may be applied are limited only by the type of deactivation which is encountered. The composition of the catalyst or reactants is therefore not controlling. Illustrative examples of processes in which the above described catalysts are useful include hydrogenation such as the production of cyclohexane from benzene, alkylation of aromatics with olefins, isomerization of naphthenes, hydrogen transfer reactions, and the isomerization of alkyl benzenes.

With such a wide range of possible applications, suitable reaction conditions will vary greatly. Normally, the reaction zone will be under a positive pressure of up to several thousand pounds per square inch and at a temperature of from about 200° F. to about 1000° F. or more. For the isomerization of normal $C_4$–$C_7$ paraffins, reaction conditions include a temperature of about 300° F. to about 500° F. and a pressure of about 1000 p.s.i.g. but the pressure may be lowered if necessary to ensure vapor phase conditions. In a naphtha gasification reactor the temperature would normally be higher and range from about 750° F. to about 950° F. Reaction conditions are also meant to include such desirable procedures as diluting the reacants with recirculated hydrogen or charging a halogen containing compound to the reactor to promote catalyst stability.

The amount of conversion per pass can be monitored by measuring temperature profiles within or between the passes, but this can be misleading. For example, in the exothermic isomerization of $C_6$ paraffins, the temperature rise from this reaction is often distorted by the heat given off by the hydrogenation of benzene carried over from the feed stream preparation. This is further complicated by the fact that catalyst which is deactivated as far as isomerization is concerned is often still very active for benzene dehydrogenation. On stream chromatographic or chemical analysis is therefore preferred to control the rate of catalyst transfer.

I claim as my invention:

1. A hydrocarbon conversion process for use with a catalyst which is deactivated to less than one quarter of its previous activity in a sharp, zonal manner, said deactivation being due to a cause other than the deposition of carbon and metals on the catalyst, and which comprises the steps of:
    (a) transferring catalyst downward through a multipass radial flow moving bed reactor by intermittently adding quantities of active catalyst at the top of the reactor and at a substantially equal rate removing catalyst from the bottom of the reactor;
    (b) passing the hydrocarbon upward through the reactor in a flow pattern that is stepwise countercurrent to the catalyst flow, the hydrocarbon flowing over the catalyst in a radial direction between inner and outer reactant transfer volumes which direct the flow between passes in an upward direction;
    (c) adjusting the catalyst transfer rate to maintain within a single selected pass, zones of active and deactivated catalyst, both zones extending the entire height and circumference of the selected pass.

2. The process of claim 1 wherein the hydrocarbon is channeled through at least 3 separate passes.

3. The process of claim 1 wherein the catalyst comprises a halogen and a platinum group metal supported on an inorganic oxide base.

4. The process of claim 1 wherein said selected pass is the second passed of the hydrocarbons over catalyst.

5. The process of claim 1 wherein the rate of catalyst transfer is adjusted by monitoring the conversion in a pass prior to said selected pass, and the rate of catalyst transfer is sufficient to maintain some active catalyst within this prior pass.

6. The process of claim 1 wherein the hydrocarbon conversion comprises the gasification of a naphtha.

7. A hydrocarbon conversion process which comprises the steps of:
    (a) transferring catalyst downward through a multipass radial flow moving bed reactor maintained at reaction conditions, the transfer being performed by intermittently adding quantities of active catalyst near the top of the reactor and at a substantially equal rate removing catalyst from near the bottom of the reactor, said active catalyst comprising a halogen and being one which is deactivated in a sharp, zonal manner by contact with water;
    (b) passing the hydrocarbon upward through the reactor in a flow pattern that is stepwise countercurrent to the catalyst flow, the hydrocarbon flowing radially through the individual passes, with each pass being over more recently added catalyst than the previous pass;
    (c) adjusting the catalyst transfer rate to maintain within a single selected pass, zones of active and deactivated catalyst, both zones extending the entire height and circumference of the selected pass.

8. The process of claim 7 wherein the rate of catalyst transfer is adjusted by monitoring the conversion in a pass prior to said selected pass, and the rate of catalyst transfer is sufficient to maintain a zone of active catalyst in this prior pass.

9. A hydrocarbon isomerization process which comprises the steps of:
    (a) transferring a solid catalyst downward through a multipass radial flow moving bed reactor maintained at isomerization conditions by intermittently adding quantities of active catalyst near the top of the reactor and removing substantially equal quantities of deactivated catalyst near the bottom of the reactor, said catalyst being one which is deactivated in a sharp zonal manner when contacted by water;
    (b) passing a heated mixture comprising the hydrocarbon and hydrogen upward through the reactor in a stepwise countercurrent flow pattern as compared to the catalyst flow, the reactants flowing radially through the individual passes, with each pass being over more recently added catalyst than the previous pass;
    (c) adjusting the rate of catalyst transfer to maintain within a single selected pass zones of active and deactivated catalyst, both zones extending across the entire height and circumference of the selected pass, and said selected pass being other than the final pass of the hydrocarbon mixture over catalyst.

10. The process of claim 9 wherein the hydrocarbon comprises $C_4$–$C_7$ normal paraffins.

11. The process of claim 9 wherein the catalyst comprises platinum and chlorine supported by an inorganic oxide base.

References Cited

UNITED STATES PATENTS

| | | | |
|---|---|---|---|
| 2,506,122 | 5/1950 | Watson | 208—169 |
| 2,303,717 | 12/1942 | Arveson | 208—165 |
| 2,997,374 | 8/1961 | Lavender et al. | 23—288 G |
| 3,506,733 | 4/1970 | Mayhue | 260—683.68 |

DELBERT, E. GANTZ, Primary Examiner

J. W. HELLWEGE, Assistant Examiner

U.S. Cl. X.R.

208—169; 260—683.68; 423—651; 23—288 G

UNITED STATES PATENT OFFICE
CERTIFICATE OF CORRECTION

Patent No. 3,799,866  Dated  March 26, 1974

Inventor(s) Robert A. Lengemann

It is certified that error appears in the above-identified patent and that said Letters Patent are hereby corrected as shown below:

The heading along the top of the first page of the specification should read:

-- Patented Mar. 26, 1974 --

Signed and sealed this 16th day of July 1974.

(SEAL)
Attest:

McCOY M. GIBSON, JR.  C. MARSHALL DANN
Attesting Officer  Commissioner of Patents